US011287244B1

(12) United States Patent
Acker et al.

(10) Patent No.: US 11,287,244 B1
(45) Date of Patent: Mar. 29, 2022

(54) REGULARIZED SHEAROGRAMS FOR PHASE RESOLVED SHEAROGRAPHY

(71) Applicant: BAE SYSTEMS INFORMATION AND ELECTRONIC SYSTEMS INTEGRATION INC., Nashua, NH (US)

(72) Inventors: Andrew N. Acker, Honolulu, HI (US); Michael J. DeWeert, Kaneohe, HI (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 205 days.

(21) Appl. No.: 16/414,871

(22) Filed: May 17, 2019

(51) Int. Cl.
*G01B 11/16* (2006.01)
*G01J 9/02* (2006.01)
*G01B 9/02* (2022.01)
*G01B 9/02098* (2022.01)

(52) U.S. Cl.
CPC ........ *G01B 11/162* (2013.01); *G01B 9/02098* (2013.01); *G01J 9/0215* (2013.01)

(58) Field of Classification Search
CPC ... G01B 11/162; G01B 9/02098; G01J 9/0215
See application file for complete search history.

(56) References Cited

U.S. PATENT DOCUMENTS

| | | | | |
|---|---|---|---|---|
| 6,717,681 B1* | 4/2004 | Bard | ................... | G01B 11/162 356/35.5 |
| 8,717,577 B1* | 5/2014 | Kokobun | ............. | G01B 11/162 356/520 |
| 8,804,132 B1* | 8/2014 | Saxer | ................... | G01B 11/162 356/520 |
| 9,476,700 B2 | 10/2016 | DeWeert et al. | | |
| 9,818,181 B1* | 11/2017 | Acker | ................ | G01B 9/02096 |
| 10,466,038 B1* | 11/2019 | Kokubun | ............. | G01B 11/162 |
| 10,931,899 B1* | 2/2021 | DeWeert | ............... | G01B 11/162 |
| 2001/0040682 A1* | 11/2001 | Lindsay | ............. | G01M 17/027 356/520 |
| 2003/0021309 A1* | 1/2003 | Mattox | ................... | H01S 3/105 372/32 |
| 2014/0023835 A1* | 1/2014 | Freimann | ............... | G01M 11/00 428/195.1 |

(Continued)

OTHER PUBLICATIONS

Dahi Ghareab Abdelsalam and Baoli Yao, "Interferometry and its Applications in Surface Metrology," Optical Interferometry, publisher IntechOpen, editor Alexander A. Banishev and Mithun Bhowmick and Jue Wang, chapter 5,doi={10.5772/66275}, https://doi.org/10.5772/66275 (Year: 2017).*

(Continued)

*Primary Examiner* — Violeta A Prieto
(74) *Attorney, Agent, or Firm* — Sand, Sebolt & Wernow LPA; Scott J. Asmus

(57) ABSTRACT

A shearography a system and method for regularizing phase resolved shearograms with an arctan regularization function to produce regularized phase resolved shearogram outputs is provided. The system and method of the present disclosure optimizes the processing of phase resolved shearography allowing interference fringe analysis techniques to be applied to the regularized phase resolved shearogram output results of the processing.

20 Claims, 6 Drawing Sheets

(56) References Cited

U.S. PATENT DOCUMENTS

| | | | | |
|---|---|---|---|---|
| 2014/0368832 A1* | 12/2014 | Salvade | ............ | G01B 9/02081 |
| | | | | 356/497 |
| 2015/0338208 A1* | 11/2015 | DeWeert | ................ | G01V 1/226 |
| | | | | 356/520 |
| 2016/0025478 A1* | 1/2016 | Johnson | ............. | G01B 9/02069 |
| | | | | 702/191 |
| 2017/0284893 A1* | 10/2017 | Freimann | ............ | G03F 7/70591 |
| 2020/0363185 A1* | 11/2020 | Saxer | ................... | G01B 11/162 |
| 2020/0378751 A1* | 12/2020 | Acker | ................. | G06K 9/4628 |

OTHER PUBLICATIONS

Waldner, S., and Brem, S.; Compact Shearography System for the Measurement of 3D Deformation, pp. 141-148, Aug. 1999 International Conference on Optical Metrology, Pultusk Castle, Poland.

Aebischer, H. A., and Waldner, S.; A simple and effective method for filtering speckle-interferometric phase fringe patterns, pp. 205-210, Apr. 15, 1999, Optics Communications, vol. 162.

* cited by examiner

REGULARIZED SHEAROGRAMS FOR PHASE RESOLVED SHEAROGRAPHY

STATEMENT OF GOVERNMENT INTEREST

This invention was made with government support under Prime Contract No. N00014-16-C-3039 awarded by the U.S. Navy. The government has certain rights in the invention.

TECHNICAL FIELD

The present disclosure relates generally to remote sensing. More particularly, the present disclosure relates to regularized shearograms for phase resolved shearography for remote sensing. Specifically, the present disclosure relates to regularizing phase resolved shearograms with an arctan regularization function to produce regularized phase resolved shearogram outputs.

BACKGROUND

In Non Phase resolved (NPR) shearography, a target surface, part, or area being observed is illuminated by an expanding laser beam, and two time-sequential images are captured of the target surface, part, or area with an image-shearing camera. The first image is taken of the surface, and the second image is taken of the same surface a short time thereafter during deformation or loading of the surface. The two images taken are processed together to produce a third image (i.e., a shearogram) showing a fringe pattern that depicts the gradient of the displacement of the surface due to some loading of the surface between the first and second images.

More particularly, shearography is an optical measuring technique using coherent light for the interferometric observation of the surfaces typically under non-destructive thermal or mechanical loading to distinguish between structural information and anomalies of the surfaces or parts due to loading such as thermal or mechanical loading. The two images are each laterally displaced images taken of the surface, part, or area being observed and the two images are coherently superposed. The lateral displacement is called the shear of the images. The superposition of the two images is called a shearogram, which is an interferogram of an object wave with the sheared surface wave as a reference wave.

The absolute difference of two shearograms recorded at different physical loading conditions of the target surface, part, or area is an interference fringe pattern which is directly correlated to the difference in the deformation state of the target surface, part, or area between taking the two images thereof. In contrast to holographic interferometry, the fringe pattern in NPR shearography indicates the magnitude (but not the sign or phase) of the slope of deformation rather than the deformation itself. Defects inside the target surface, part, or area will affect the local surface deformation induced by the loading and result in a disturbance of the loading fringes that are detected.

The resultant difference images always exhibit a very noisy structure. This is due to speckles, which are defined as statistical interference patterns which occur after reflection of a coherent wave off a rough surface, giving the image a grainy structure. Regarding shearography, the speckles are the carrier of information, coding the wave field and surface state information respectively and giving rise to interference fringe patterns. However, the grainy nature of the speckles is conserved and significantly decreases contrast and signal to noise ratio of the difference images.

The difference images typically exhibit strong noise and low contrast that require further image processing. This further image processing can be either image improvement or image evaluation. The goal is to remove speckle noise and to increase fringe contrast in order to improve the visibility of the fringes.

One method of further image processing, which is usually used for processing phase resolved shearograms, includes utilizing a median filter in order to recover desired phase information; however, the median filter is computationally expensive and does not have a strict mapping rule.

SUMMARY

Issues continue to exist with processing phase resolved shearography. The present disclosure addresses these and other issues by providing a system and method for regularizing phase resolved shearograms with an arctan regularization function to produce regularized phase resolved shearogram outputs.

In one aspect, an exemplary embodiment of the present disclosure may provide a method comprising sequentially reflecting a first laser beam off of a target surface when the target surface is under a first load to produce a first reflected laser beam, a second laser beam off of the target surface when the target surface is under a second load to produce a second reflected laser beam image, a third laser beam off of the target surface when the target surface is under a third load to produce a third reflected laser beam image, and a fourth laser beam off of the target surface when the target surface is under a fourth load to produce a fourth reflected laser beam image; wherein at least one of the first, second, third, and fourth loads is different from another one of the first, second, third, and fourth loads; phase stepping the first, second, third and fourth reflected laser beam images with a shearing interferometer to respective phases θ1, θ2, θ3, and θ4 wherein cos θ1=cos θ4 and cos θ2=cos θ3; wherein sin θ2 is not equal to sin θ3, collecting, with shearography equipment, first, second, third and fourth specklegrams of the target surface based respectively on the first, second, third and fourth reflected laser beam images; comparing the first, second, third and fourth specklegrams to one another to produce a shearogram to ascertain surface changes of the target surface; wherein the shearogram is based on a phase resolved shearogram equation expressed as a ratio of differences of specklegrams:

$$Shearogram = N \frac{S_4 - S_1}{S_2 - S_3}$$

wherein the first specklegram is represented by (S1), the second specklegram is represented by (S2), the third specklegram is represented by (S3) and the fourth specklegram is represented by (S4); and wherein N is a normalization term; and regularizing the shearogram with an arctan regularization function to produce a regularized phase resolved shearogram output.

In one example, θ1 is 0, θ2 is π/2, θ3 is 3π/2, and θ4 is 2π and the method generates symmetric phase resolved butterfly patterns. The method includes writing the phase resolved shearogram in terms of the numerator and the denominator according to the following equation:

$$PR = \frac{T_{41}}{T_{23}}; T_{41} = (S_4 - S_1); T_{23} = (S_2 - S_3)$$

where S1, S2, S3, and S4 are unfiltered specklegrams.

The method further includes computing the arctan regularization according to the following equation:

$$PR \Rightarrow \frac{1}{2}[a\tan2(\{T_{23}\}, \{T_{41}\}) - a\tan2(\{T_{23}\}, \{-T_{41}\})].$$

The method further includes applying interference fringe analysis techniques to the regularized phase resolved shearogram output. The method further includes producing a second shearogram to ascertain surface changes of the target surface.

The method further includes moving the shearography equipment relative to the target surface between specklegram collection and comparing specklegrams. The method further includes carrying the shearography equipment with a moveable platform; and moving the moveable platform relative to the target surface between specklegram collection and comparing specklegrams. The moveable platform may be one of an aircraft, watercraft, spacecraft, land motor vehicle and a handheld device. The method further includes determining whether there is a subsurface structure based, at least in part, on the surface changes of the target area.

In another aspect, an exemplary embodiment of the present disclosure may provide a shearography system comprising a device to stimulate a target surface; a sensor to sense the target surface; an image generator to generate a first specklegram image, a second specklegram image, a third specklegram image, and a fourth specklegram image based on data from the sensor; phase logic that phase steps the first, second, third and fourth specklegram images with a shearing interferometer to respective phases θ1, θ2, θ3, and θ4; wherein cos θ1=cos θ4 and cos θ2=cos θ3; wherein sin θ2 is not equal to sin θ3; shearogram logic that produces a shearogram to ascertain surface changes of the target surface; wherein the shearogram is based on a phase resolved shearogram equation expressed as a ratio of differences of specklegrams:

$$Shearogram = N\frac{S_4 - S_1}{S_2 - S_3}$$

wherein the first specklegram is represented by ($S_1$), the second specklegram is represented by ($S_2$), the third specklegram is represented by ($S_3$) and the fourth specklegram is represented by ($S_4$); and wherein N is a normalization term; and regularization logic that regularizes the shearogram with an arctan regularization function to produce a regularized phase resolved shearogram output. In one example, θ1 is 0, θ2 is π/2, θ3 is 3π/2, and θ4 is 2π.

The regularization logic writes the phase resolved shearogram in terms of the numerator and the denominator according to the following equation:

$$PR = \frac{T_{41}}{T_{23}}; T_{41} = (S_4 - S_1); T_{23} = (S_2 - S_3)$$

where $S_1$, $S_2$, $S_3$, and $S_4$ are unfiltered specklegrams.

The regularization logic computes the arctan regularization according to the following equation:

$$PR \Rightarrow \frac{1}{2}[a\tan2(\{T_{23}\}, \{T_{41}\}) - a\tan2(\{T_{23}\}, \{-T_{41}\})].$$

The shearography system further includes interference fringe analysis logic that applies interference fringe analysis techniques to the regularized phase resolved shearogram output. The shearography system further includes a moveable platform. The moveable platform is one of an aircraft, watercraft, spacecraft, land motor vehicle and a handheld device. The shearography system further includes detection logic that detects surface changes of the target area; wherein the surface changes are indicative of a subsurface structure.

In yet another aspect, an exemplary embodiment of the present disclosure may provide a shearography a system and method for regularizing phase resolved shearograms with an arctan regularization function to produce regularized phase resolved shearogram outputs is provided. The system and method of the present disclosure optimizes the processing of phase resolved shearography allowing interference fringe analysis techniques to be applied to the regularized phase resolved shearogram output results of the processing.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

U.S. Pat. No. 9,476,700 to DeWeert et al. (hereinafter the "700 Patent"), which is incorporated by reference as if fully rewritten herein, discloses phase resolved shearography techniques. The present disclosure provides additional information and improvements to the techniques described in the 700 Patent.

Figure 1:
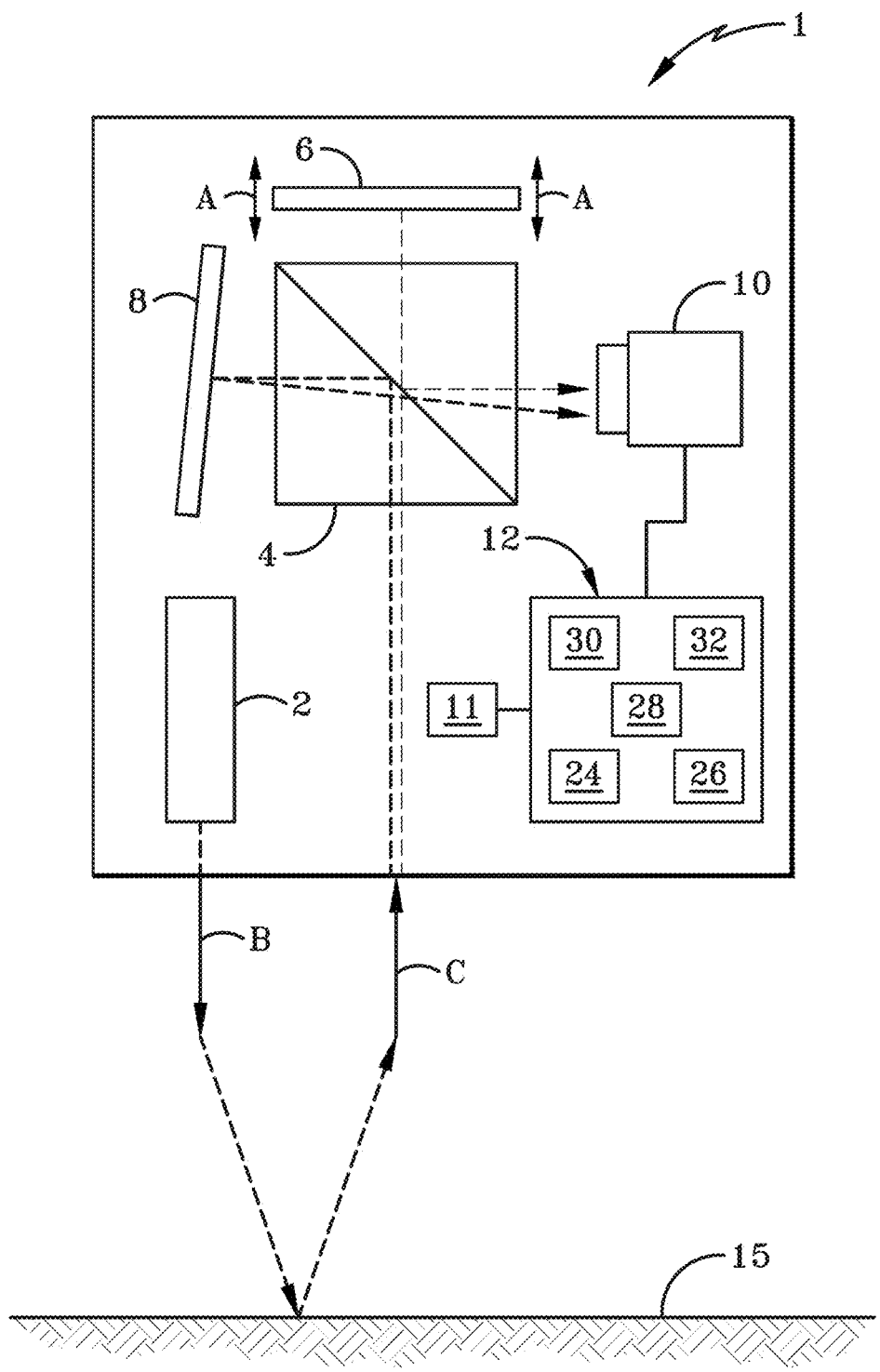
FIG. 1 is a schematic view of a temporal-stepping shearography apparatus in accordance with the present disclosure.

FIG. 1 shows a temporal-stepping shearography apparatus 1 of a system which includes a Michelson interferometer comprising one or more laser transmitters 2, (which generally may be referred to as a "device" or "devices" in the appended claims), a beam splitter 4, first and second mirrors 6 and 8, an image-shearing camera 10, (which generally may be referred to as "sensor" in the appended claims) and at least one non-transitory computer readable storage medium 11 having instructions encoded thereon that, when executed by at least one processor 12, implements various logics, (which generally may be referred to as an "image generator" in the appended claims), as more fully described below. One of the mirrors is steppable or movable (Arrows "A" in FIG. 1) to provide a phase-stepping system 1. In FIG. 1, untilted mirror 6 is shown as a steppable mirror, as indicated by the arrows A adjacent mirror 6, whereas mirror 8 is a tilted mirror for adjusting the shear tilt. Using the untilted mirror 6 as the stepper provides mechanical simplicity and robustness. A piezo-electric actuator is provided in operative communication with mirror 6 for moving mirror 6 physically. Alternately, an electronically controllable phase retarder may be used, but this will reduce throughput possibly requiring use of additional laser power. The piezo-electric actuator is controlled to vibrate mirror 6 and the laser transmitter 2 is controlled or triggered to fire at the desired mirror positions, that is, when the mirror 6 is at respective desired positions.

Although a Michelson interferometer is suitable for the present process, a variety of shearing interferometers may be used, such that the interferometer is configured to collect multiple shearographic images with controlled phase differences between the arms of the interferometer. A shearing configuration of any interferometer type is usable. For example, and without limitation, suitable interferometers may include glass-plate or glass-wedge interferometers, air-wedge interferometers, Mach-Zender interferometers and the like. Multi-port versions of any type of shearing interferometer may also be used.

Figure 2:
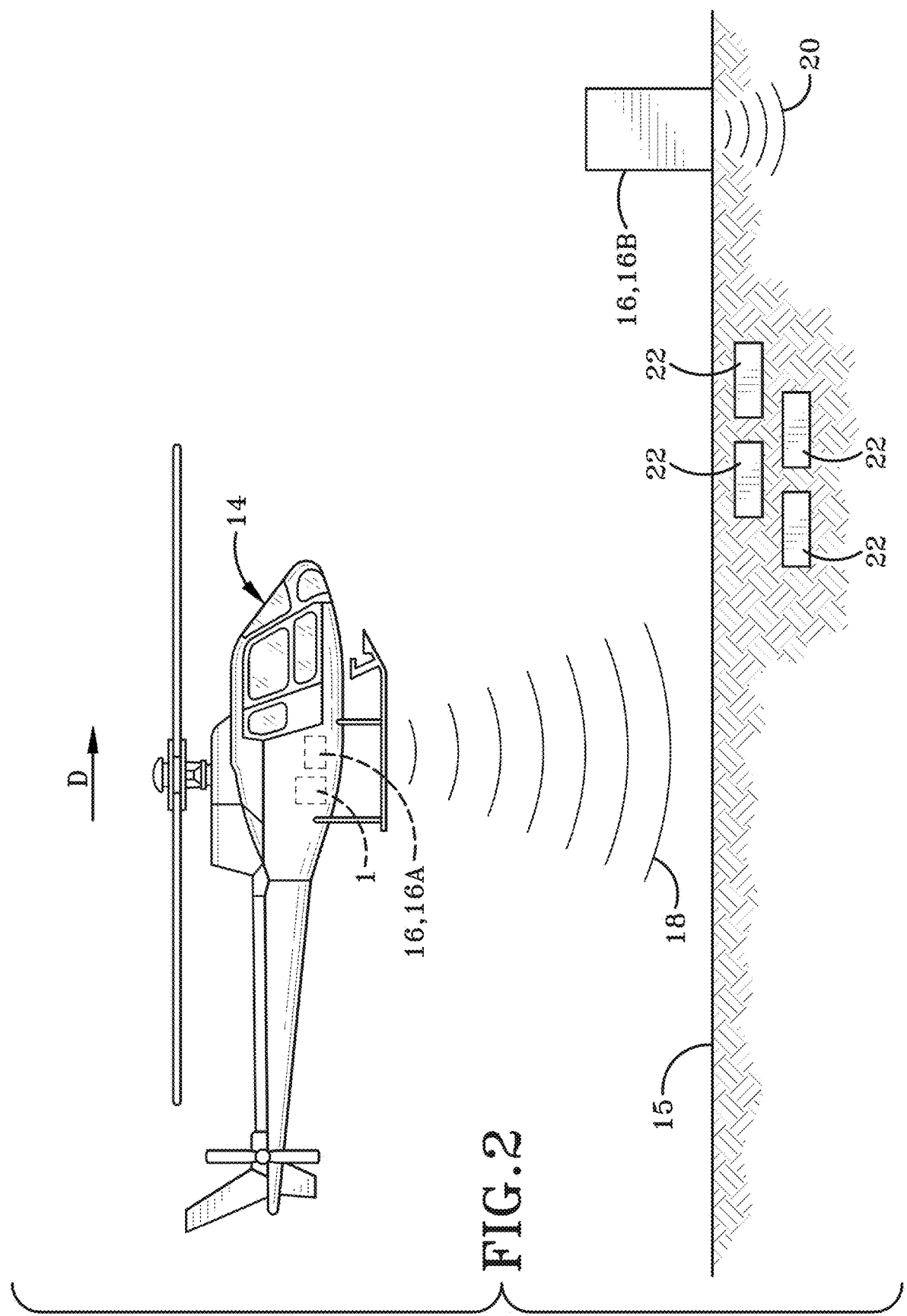
FIG. 2 is a diagrammatic view showing an exemplary use of the shearography apparatus onboard a moveable platform.

As shown in FIG. 2, the shearography equipment or apparatus 1 is mounted on a moveable platform 14, which may include powered transport or vehicles such as aircraft, watercraft (surface craft or underwater craft), spacecraft or land motor vehicles which may be manned or unmanned, whereby, for instance, an aircraft may be a manned/piloted aircraft or an unmanned aerial vehicle (UAV). The moveable platform 14 may also be a handheld device which may move as a result of being carried by a person who is moving (under his or her own power or via a powered vehicle) or by being carried by one of the other moveable platforms noted above. For purposes of example, moveable platform 14 is shown as a helicopter carrying the equipment 1. The equipment 1 moves with moveable platform 14 relative to a target or target surface 15 during operation of equipment 1. This movement of moveable platform 14 and apparatus 1 is shown at Arrow "D" in FIG. 2, which also represents the forward direction of movement or flight of the moveable platform 14. The movement of the moveable platform 14 and apparatus 1 during the emission of laser beams and collection of specklegrams is typically generally parallel to the target surface 15 or ground.

A target excitation device 16 is provided to non-destructively deform or load target 15. The target excitation device 16 may be an onboard excitation device 16A (FIG. 2) mounted on the moveable platform 14 or may be a separate excitation device 16B (FIG. 2) which is separate from or not on the moveable platform 14. The target excitation device 16A may be, for instance, a sound driver or acoustic source or speaker capable of producing or emitting sound waves 18 (FIG. 2). For example, the target excitation device 16A may emit a relatively high power, low frequency sound wave which is directed from the moveable platform 14/apparatus 1 toward the ground or other target surface 15 to vibrate (deform or load) the ground or other target surface 15. Separate target excitation device 16B may be, for example, a seismic thumper which may be in the form of a thumper truck, which may also be known as a vibroseis truck or vibe truck. A seismic thumper impacts or is directed toward the ground or other target surface 15 to likewise vibrate (deform or load) the ground or other target surface 15, as illustrated by waves or vibrations 20 (FIG. 2). The use of shearography equipment 1 allows for the discernment of underground anomalies 22 (FIG. 2) such as underground ordnance or landmines (including improvised explosive devices or IED) or other subsurface or underground objects or structures such as rooms, tunnels, pipes and so forth.

The logics executed by at least one processor 12 include phase logic 24, shearogram logic 26, regularization logic 28, interference fringe analysis logic 30, and detection logic 32. The phase logic 24, the shearogram logic 26, the regularization logic 28, the interference fringe analysis logic 30, and the detection logic 32 are stored in the at least one non-transitory storage medium 11; however, it is envisioned that the phase logic 24, the shearogram logic 26, the regularization logic 28, the interference fringe analysis logic 30, and the detection logic 32 may be stored in separate storage mediums (not shown). Although particular logics have been described, it is to be understood that the temporal-stepping shearography apparatus 1 may include any suitable logics.

In the basic operation of shearography apparatus 1, one of the one or more laser transmitters 2 transmits, emits or shoots a laser beam (Arrow B in FIG. 1) which impacts a target surface or target area 15 and is reflected from area 15 as a reflected laser beam image (Arrow C in FIG. 1) back to apparatus 1 into beam splitter 4, onto mirrors 6 and 8 and into camera 10, which captures the reflected image in two copies which are laterally displaced (sheared image copies) and combined to form a specklegram. The reflected laser beam images and specklegrams are collected and stored or saved in the at least one non-transitory computer readable storage medium 11. The various logics 24, 26, 28, 30, and 32, are configured to process the specklegrams to produce a shearogram from which can be discerned surface changes of target surface 15 and corresponding subsurface structures or movements as well as calculate the various relevant equations discussed below in order to effect the methods discussed herein.

For example, the phase logic 24 phase steps the first, second, third and fourth shearographic images with a shearing interferometer to respective phases 81, 82, 83, and 84, the shearogram logic 26 produces a shearogram to ascertain surface changes of the target surface, the regularization logic 28 regularizes the shearogram with an arctan regularization function to produce a regularized phase resolved shearogram output, the interference fringe analysis logic 30 applies interference fringe analysis techniques to the regularized phase resolved shearogram output, and the detection logic 32 detects surface changes of the target area; wherein the surface changes are indicative of a subsurface structure.

Figure 3:
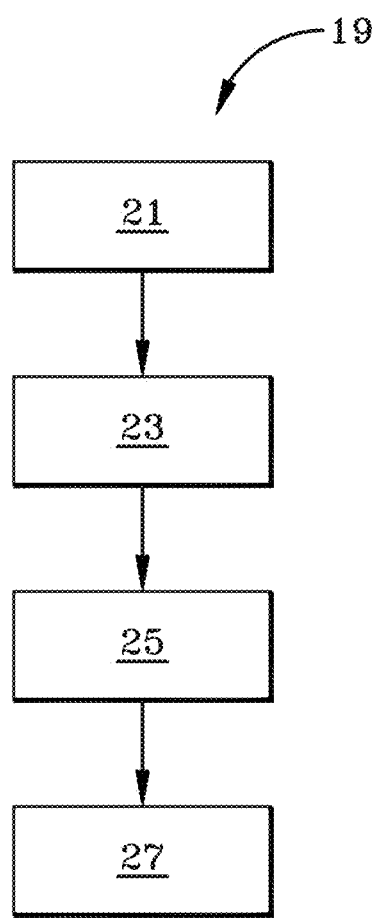
FIG. 3 is a flowchart showing an exemplary shearography method in accordance with the present disclosure.

One shearography method 19 is shown in FIG. 3. As shown in block 21, the method may include reflecting sequentially off of a target surface (such as 15) at least four laser beams when the target surface is respectively under different loads (and different surface states) to produce respective reflected laser beam images. This method includes phase stepping the reflected laser beam images with a shearing interferometer (block 23), collecting specklegrams of the target surface based respectively on the reflected laser beam images (block 25), and comparing the specklegrams to one another to create or produce a shearogram to ascertain surface changes of the target surface (block 27). The shearing interferometer of shearography equipment 1 is configured with stepping mirror 6 or another phase shifting or phase stepping optical element to phase shift or phase step the reflected laser beams images. Four laser beam emissions or shots are used to respectively produce four reflected laser beam images, which in turn are used to respectively produce four specklegrams. It is noted that for a given set of the laser beams used to derive a given specklegram, the laser beam wavelength of each laser beam is the same for that given set. A set of four specklegrams may be processed or compared to one another to produce a given shearogram. This process may be repeated as many times as desired to produce as many shearograms as desired over time.

Thus, for instance, a first shearogram may provide information indicative of surface changes (such as surface relief changes) of the target surface at a given time (when a given/first set of laser beams used to create a specklegram are reflected off of the target surface); a second shearogram may provide information indicative of surface changes of the target surface at a subsequent given time (when a given/second subsequent set of laser beams used to create a specklegram are reflected off of the target surface); a third shearogram may provide information indicative of surface changes of the target surface at a subsequent given time (when a given/third subsequent set of laser beams used to create a specklegram are reflected off of the target surface); and a fourth shearogram may provide information indicative of surface changes of the target surface at a subsequent given time (when a given/fourth subsequent set of laser beams used to create a specklegram are reflected off of the target surface). The first, second, third, and fourth shearograms thus provide surface change information at time intervals so that the observer of the shearograms can discern surface changes of the target surface over time, which may even occur in a movie format in essentially real time. Various aspects of the method or methods at issue are discussed in greater detail hereafter.

When onboard excitation device 16A is a sound driver, device 16A is operated to insonify target area 15, thereby deforming or loading target 15. Separate device 16B may also be used. In either case, the target surface 15 is deformed or loaded. It is noted that other sources (e.g., ambient excitations) of deformation or vibration may also be used to deform or load the target surface, wherein such sources are not controlled by the user or investigator. Thus, for instance, any natural source of vibration may be used as an excitation providing a given load on the target surface.

While target surface 15 is thus deformed or loaded with a first load, one of laser transmitters 2 transmits or shoots a first laser beam (Arrow B) onto target area 15 such that the first laser beam is reflected (Arrow C) and sheared and phase stepped/shifted via the shearing interferometer to produce an image which is captured by camera 10 and saved or stored. Very shortly (typically a few milliseconds) after producing the first load and after the first transmission of the laser beam, device 16A or 16B (or another source) may be operated to similarly deform or load target 15 with a second load which is different from the first load. While surface 15 is thus deformed or loaded with the second load, one of laser transmitters 2 likewise transmits or shoots a second laser beam (Arrow B) onto target area 15 so that the second laser beam is likewise reflected (Arrow C) and sheared and phase stepped via the interferometer to produce an image which is captured by camera 10 and saved or stored.

This process of loading target area 15 with different loads and transmitting laser beams onto target area 15 may occur multiple times at very brief time intervals (again, typically a few milliseconds between a given pair of loads and a given pair of laser shots). Thus, for instance, shortly after producing the second load and after the second laser beam transmission, device 16A or 16B (or another source) may load target 15 with a third load which is different from the first and second loads, so that while surface 15 is loaded with the third load, one of laser transmitters 2 transmits onto target area 15 a third laser beam which is reflected and sheared and phase stepped via the interferometer to produce a third image captured by camera 10 and saved or stored; and shortly after producing the third load and after the third laser beam transmission, device 16A or 16B (or another source) may load target 15 with a fourth load which is different from the first, second and third loads, so that while surface 15 is loaded with the fourth load, one of laser transmitters 2 transmits onto target area 15 a fourth laser beam which is reflected and sheared and phase stepped via the interferometer to produce a fourth image captured by camera 10 and saved or stored.

This process may continue although three or four laser shots and captured images are typically sufficient to produce a given shearogram with the desired information as to a certain target area of a given size. Nonetheless, this process may continue with respect to a larger target area in order to produce as many shearograms as needed to obtain the desired information. As noted or suggested above, the time between a given pair of laser shots and between a given pair of loads may be very short. The time between laser beam shots may be less than one half the wavelength of an acoustic excitation or sound wave. While this may vary, in many cases, three, four or five laser beam shots may occur within five or ten milliseconds.

This system and method are set up in a manner which allows for obtaining shearograms without using unloaded specklegrams. Rather, the shearography equipment 1 may be used to produce a plurality of laser emissions to the ground or other target surface 15 while that target surface 15 is loaded by an excitation device 16A or 16B (controlled or uncontrolled) such that all of the specklegrams may be loaded specklegrams. The present method is discussed in greater detail below.

As stated in the 700 Patent, the rules for selecting the phase steps of one of the phase resolved shearograms algorithms are as follows: (cos θ1=cos θ4), (cos θ2=cos θ3), (sin θ2≠sin θ3). Moreover, the phase steps between the laser beams and specklegrams $S_1$, $S_2$, $S_3$, $S_4$ do not need to all be equal. In one particular embodiment, four specklegrams are defined as follows:

$$S_1 \to \frac{I_1 + I_2}{2} + \sqrt{I_1 I_2} \cos(\omega t + 0)$$

$$S_2 \to \frac{I_1 + I_2}{2} + \sqrt{I_1 I_2} \cos\left(2\omega t + \frac{\pi}{2}\right)$$

$$S_3 \to \frac{I_1 + I_2}{2} + \sqrt{I_1 I_2} \cos\left(3\omega t + \frac{3\pi}{2}\right)$$

$$S_4 \to \frac{I_1 + I_2}{2} + \sqrt{I_1 I_2} \cos(4\omega t + 2\pi)$$

where $S_1$ represents a first specklegram, $S_2$ represents a second specklegram, $S_3$ represents a third specklegram, and $S_4$ represents a fourth specklegram. The first specklegram $S_1$ has a phase step of 0, an amplitude (linear target of 1) and an amplitude representation (target phase) of $\omega t$, the second specklegram $S_2$ has a phase step of $\pi/2$, an amplitude (linear target) of 2 and an amplitude representation (target phase) of 2 wt, the third specklegram $S_3$ has a phase step of $3\pi/2$, an amplitude (linear target) of 3 and an amplitude representation (target phase) of $3\omega t$, and the fourth specklegram $S_4$ has a phase step of $2\pi$, an amplitude (linear target) of 4 and an amplitude representation (target phase) of $4\omega t$. Although a particular set of unequal phase steps has been described above, it is to be entirely understood that the processing of the present disclosure can also be used with other step sequences that meet the PR criteria from the '700 Patent.

The present system/method provides exquisite sensitivity to measure very small surface motions. Consider a target surface moving under continuously time-varying load such that two points on the target surface which are centered on a location (x,y) and which are separated by the shear distance move with a time-varying relative amplitude $\phi(x,y,t)$ which is a small fraction (for example, 1/10th) of the wavelength of the laser radiation. Specklegram pixels corresponding to point (x,y) will also have a speckle noise phase $\phi N$ which is random.

For four specklegrams $S_1$, $S_2$, $S_3$ and $S_4$ acquired respectively at different/sequential times t1, t2, t3 and t4 with respective phase-modulations of $\theta 1=0$ radians, $\theta 2=\pi/2$ radians, $\theta 3=3\pi/2$ radians and $\theta 4=2\pi$ radians relative to the laser wavelength, then the phase resolved shearogram output function, which may also be referred to as $F_{SO}$, designated below:

$$Shearogram = N\frac{S_4 - S_1}{S_2 - S_3} \qquad \text{Equation (1)}$$

where N is a normalization term.

The presence of random variables in the denominator of Equation (1) means that the shearogram must be regularized. Conventional regularization of the shearogram includes application of a computationally expensive median filter, which does not have a strict mapping rule supporting recovery of the shearogram phase value. Since the phase resolved shearogram output function $F_{SO}$ cannot be written as a tangent function, direct recovery of the phase angle through application of an arctan operation is not possible. However, arctan operations can be used to regularize the phase resolved shearogram output function $F_{SO}$. Regularizing the phase resolved shearogram output function $F_{SO}$ in this way has two advantages. The first advantage is that the arctan regularization removes the need to median filter the phase resolved shearogram output function $F_{SO}$ to suppress divergent pixel noise. The second advantage is that output of $F_{SO}$ after arctan regularization can be strictly interpreted as a phase angle; allowing the use of standard phase filtering tools developed for fringe pattern analysis. This is made possible by the property that the phase resolved shearogram output function $F_{SO}$ is well approximated by its own arctan as shown in the following equation:

$$F_{SO}(\phi) \approx \arctan(F_{SO}(\phi)); \phi \neq n_{odd}\pi \qquad \text{Equation (2)}.$$

Figure 4:
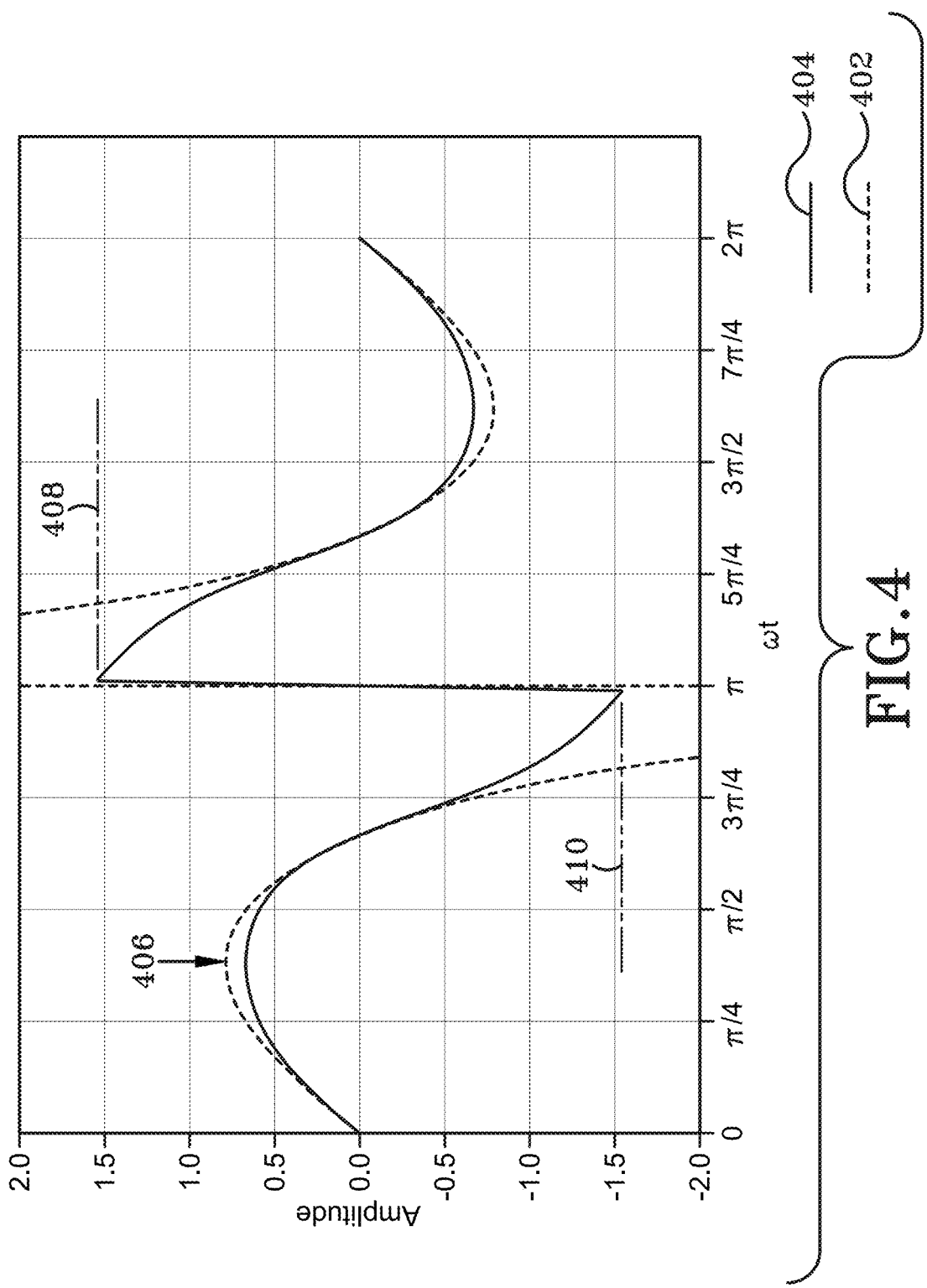
FIG. 4 is a graph of a phase resolved shearogram output and an inverse tangent operation of the phase resolved shearogram output.

FIG. 4 is a graph showing phase resolved shearogram output and an inverse tangent operation of the phase resolved shearogram output. Line 402 represents the phase resolved shearogram output and line 404 represents the inverse tangent operation of the phase resolved shearogram output. Arrow 406 is a fringe center maximum, line 408 represents a maximum amplitude of $+\pi/2$, and line 410 represents a minimum amplitude of $-\pi/2$. As shown by the graph the phase resolved shearogram output function $F_{SO}$ is well approximated by its own arctan according to the following equation:

$$F_{SO}(\omega t) \approx \arctan(F_{SO}(\omega t)) \qquad \text{Equation (3)}.$$

One exemplary application of the arctan filtering utilizes the atan 2 function, which is a symbolic four quadrant inverse tangent function, where the dynamic phase resolved shearogram is written in terms of the numerator and the denominator according to the following equation:

$$PR = \frac{T_{41}}{T_{23}}; T_{41} = (S_4 - S_1); T_{23} = (S_2 - S_3) \qquad \text{Equation (4)}$$

where $S_1$, $S_2$, $S_3$, and $S_4$ are unfiltered specklegrams. In order to maintain stable limiting behavior, the computation is as follows:

$$PR \Rightarrow \frac{1}{2}[\text{atan2}(\{T_{23}\}, \{T_{41}\}) - \text{atan2}(\{T_{23}\}, \{-T_{41}\})]. \qquad \text{Equation (5)}$$

Equation (4) is divergent as $T_{23} \to 0$. Shearograms computed in this way must be median filtered. Median filtering is computationally expensive, and does not place hard upper and lower bounds on the output value; thus, the resultant quantity cannot strictly be interpreted as an angle. These issues can in principle be addressed by replacing the ratio $T_{41}/T_{23}$ with an arc tangent-2 function PR→atan 2($T_{23}$, $T_{41}$) using the arctan 2 function to regularize the PR expression. However, using a simple single atan 2 function is also problematic. As ($T_{41}$, $T_{23}$)→(0,0) atan 2($T_{41}$, $T_{23}$) become noisy when applied to measured specklegram data, oscillating between positive and negative output values. This results in very high noise levels in the shearogram background. This problem can be corrected by using Equation (5) as the definition for a phase resolved shearogram. This quantity approaches zero smoothly and symmetrically as ($T_{23}$, $T_{41}$) →(0,0), resulting in a low noise background. Desired properties of Equation (5) include, but are not limited to, regularizing the divergences in the shearogram expression, no requirement for median filtering, the output can be interpreted as a phase angle, and control/limit of background noise.

It should be noted that the atan 2 function was first introduced in computer programming languages; however, the atan 2 function is common in other fields of science and engineering. The atan 2 function dates back to at least the 1960s and is not specific to any one particular programming language or computing environment.

As stated above, an advantage of utilizing arctan regularization on the phase resolved shearogram output $F_{SO}$ is that phase filtering can be applied to the output of Equation (5). For example, and not meant as a limitation, interference fringe analysis techniques can be applied after arctan regularization which smooths the image while maintaining sharp fringe lines. Exemplary interference fringe analysis techniques are standard fringe interferometry algorithms or processes; however, any suitable interference fringe analysis techniques may be applied.

Figure 5:
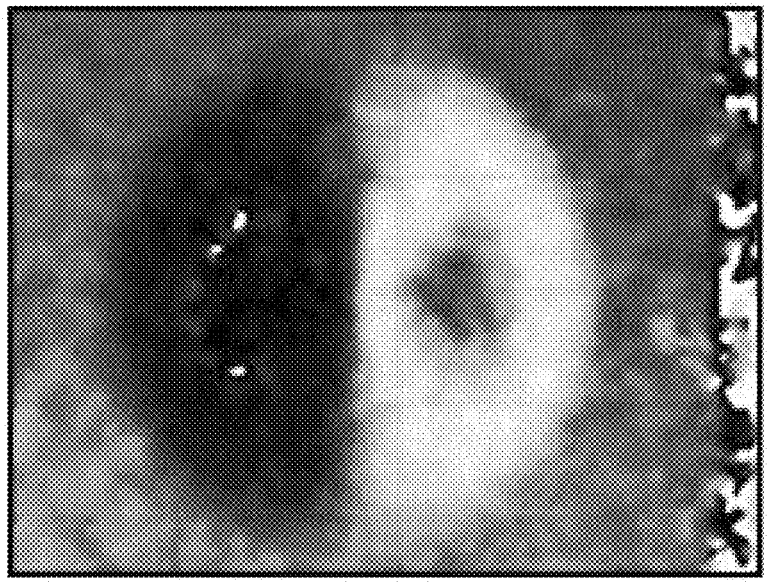
FIG. 5 is an exemplary high amplitude shearographic image after phase stepping, median filter regularization, and filtering.
Figure 6:
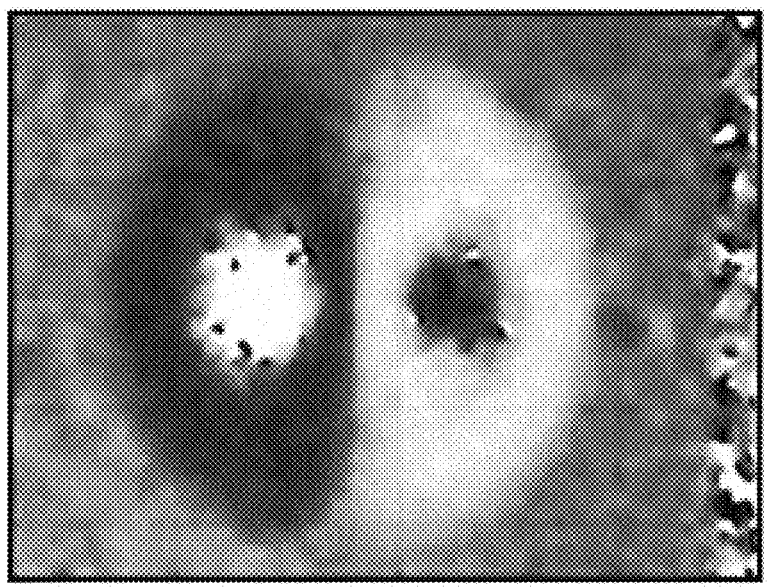
FIG. 6 is an exemplary high amplitude shearographic image after phase stepping, arctan regularization, and phase filtering.

FIG. 5 is an exemplary high amplitude shearographic image after phase stepping, median filter regularization, and filtering. FIG. 6 is an exemplary high amplitude shearographic image after phase stepping, arctan regularization, and phase filtering. As shown in FIG. 6, the phase resolved stepping methods with arctan regularization and phase filtering of the present disclosure is able to resolve the central fringe or lobe on the left hand side of the image, a feature not resolvable in FIG. 5 where median filter regularization is applied. Thus, methods used in FIG. 6 of the present disclosure provide improved phase information recovery relative to the methods used in FIG. 5.

Figure 7:
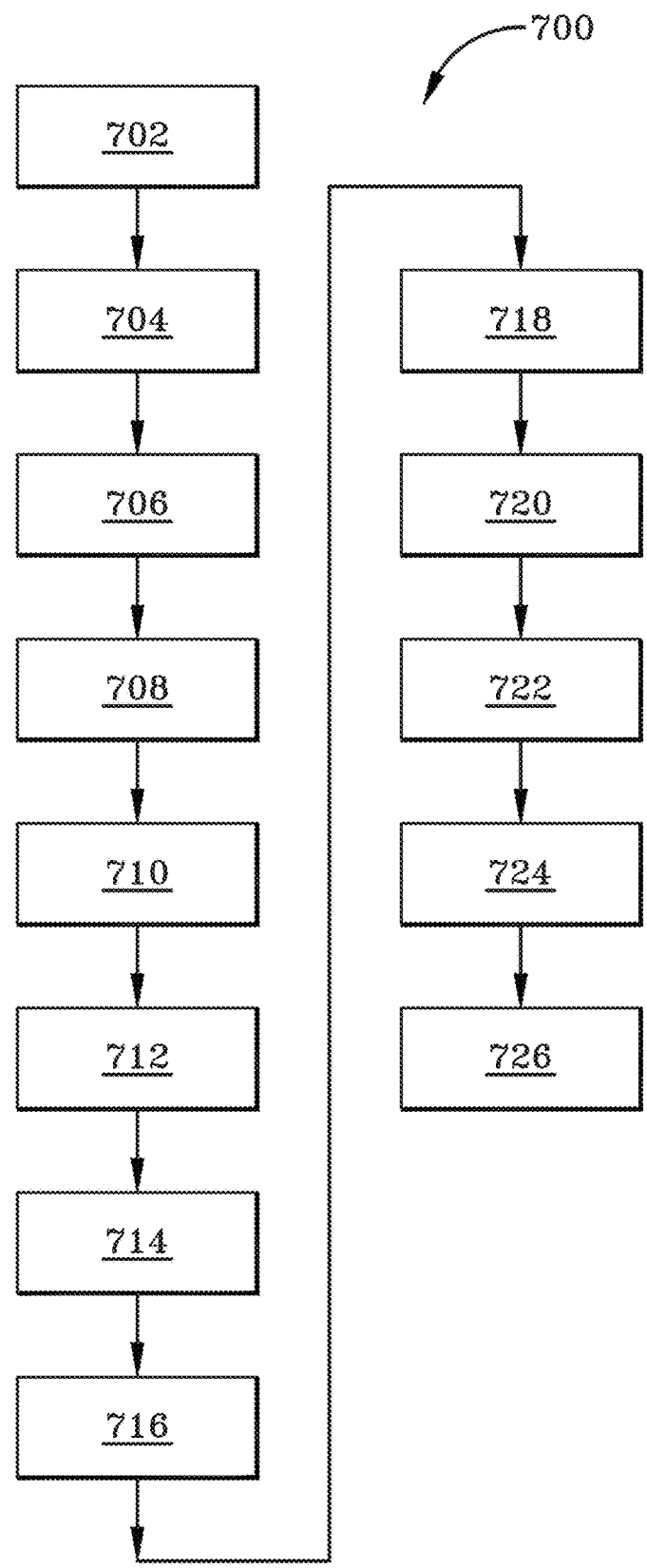
FIG. 7 is a flow chart of one method or process of the present disclosure.

FIG. 7 depicts a flowchart in accordance with an exemplary method of the present disclosure generally at 700. The method 700 includes sequentially reflecting a first laser beam off of a target surface when the target surface is under a first load to produce a first reflected laser beam, a second laser beam off of the target surface when the target surface is under a second load to produce a second reflected laser beam image, a third laser beam off of the target surface when the target surface is under a third load to produce a third reflected laser beam image, and a fourth laser beam off of the target surface when the target surface is under a fourth load to produce a fourth reflected laser beam image, which is shown generally at 702. At least one of the first, second, third, and fourth loads is different from another one of the first, second, third, and fourth loads. The method 700 includes phase stepping the first, second, third and fourth reflected laser beam images with a shearing interferometer to respective phases θ1, θ2, θ3, and θ4, which is shown generally at 704. In one example, cos θ1=cos θ4, cos θ2=cos θ3 and sin θ2 is not equal to sin θ3. The method 700 includes collecting, with shearography equipment 1, first, second, third and fourth specklegrams of the target surface based respectively on the first, second, third and fourth reflected laser beam images, which is shown generally at 706. The method 700 includes comparing the first, second, third and fourth specklegrams to one another to produce a shearogram to ascertain surface changes of the target surface, which is shown generally at 708. In one example, the shearogram is based on a phase resolved shearogram equation expressed as a ratio of differences of specklegrams:

$$Shearogram = N \frac{S_4 - S_1}{S_2 - S_3} \quad \text{Equation (1)}$$

wherein the first specklegram is represented by (S1), the second specklegram is represented by (S2), the third specklegram is represented by (S3) and the fourth specklegram is represented by (S4); and wherein N is a normalization term. The method 700 further includes regularizing the shearogram with an arctan regularization function to produce a regularized phase resolved shearogram output, which is shown generally at 710. In one example, θ1 is 0, θ2 is π/2, θ3 is 3π/2, and θ4 is 2π. The method further includes generating symmetric phase resolved butterfly patterns, which is shown generally at 712. The method 700 includes writing the phase resolved shearogram in terms of the numerator and the denominator according to the following equation:

$$PR = \frac{T_{41}}{T_{23}};\ T_{41} = (S_4 - S_1);\ T_{23} = (S_2 - S_3) \quad \text{Equation (4)}$$

where S1, S2, S3, and S4 are unfiltered specklegrams, which is shown generally at 714.

The method 700 further includes computing the arctan regularization according to the following equation:

$$PR \Rightarrow \frac{1}{2}[\text{atan2}(\{T_{23}\}, \{T_{41}\}) - \text{atan2}(\{T_{23}\}, \{-T_{41}\})], \quad \text{Equation (5)}$$

which is shown generally at 716.

The method 700 includes applying interference fringe analysis techniques to the regularized phase resolved shearogram output, which is shown generally at 718. The method 700 includes producing a second shearogram to ascertain surface changes of the target surface, which is shown generally at 720. The method 700 further includes moving the shearography equipment relative to the target surface during the reflecting, phase stepping, collecting and comparing, which is shown generally at 722. The method 700 further includes carrying the shearography equipment with a moveable platform; and moving the moveable platform relative to the target surface during the reflecting, phase stepping, collecting and comparing, which is shown generally at 724. The moveable platform 14 may be one of an aircraft, watercraft, spacecraft, land motor vehicle and a handheld device. The method 700 further includes determining whether there is a subsurface structure based, at least in part, on the surface changes of the target area, which is shown generally at 726.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method comprising:
sequentially reflecting a first laser beam off of a target surface when the target surface is under a first load to produce a first reflected laser beam, a second laser beam off of the target surface when the target surface is under a second load to produce a second reflected laser beam image, a third laser beam off of the target surface when the target surface is under a third load to produce a third reflected laser beam image, and a fourth laser beam off of the target surface when the target surface is under a fourth load to produce a fourth reflected laser beam image; wherein at least one of the first, second, third, and fourth loads is different from another one of the first, second, third, and fourth loads;
unequal phase stepping the first, second, third and fourth reflected laser beam images with a shearing interferometer to respective phases θ1, θ2, θ3, and θ4; wherein cos θ1=cos θ4 and cos θ2=cos θ3; wherein sin θ2 is not equal to sin θ3;
collecting, with shearography equipment, first, second, third and fourth specklegrams of the target surface based respectively on the first, second, third and fourth reflected laser beam images;
comparing the first, second, third and fourth specklegrams to one another to produce a shearogram to ascertain surface changes of the target surface; wherein the shearogram is based on a phase resolved shearogram equation expressed as a ratio of differences of specklegrams:

$$Shearogram = N\frac{S_4 - S_1}{S_2 - S_3}$$

wherein the first specklegram is represented by ($S_1$), the second specklegram is represented by ($S_2$), the third specklegram is represented by ($S_3$) and the fourth specklegram is represented by ($S_4$); and wherein N is a normalization term; and
regularizing the shearogram with multiple arctan regularization functions to produce a regularized phase resolved shearogram output.

2. The method of claim 1, wherein θ1 is 0, θ2 is π/2, θ3 is 3π/2, and θ4 is 2π.

3. The method of claim 1, further comprising:
writing the phase resolved shearogram in terms of a numerator and a denominator according to the following equation:

$$PR = \frac{T_{41}}{T_{23}}; T_{41} = (S_4 - S_1); T_{23} = (S_2 - S_3)$$

where $S_1$, $S_2$, $S_3$, and $S_4$ are unfiltered specklegrams.

4. The method of claim 3, further comprising:
computing the arctan regularization according to the following equation:

$$PR \Rightarrow \frac{1}{2}[\mathrm{atan2}(\{T_{23}\}, \{T_{41}\}) - \mathrm{atan2}(\{T_{23}\}, \{-T_{41}\})].$$

5. The method of claim 4, further comprising:
applying interference fringe analysis techniques to the regularized phase resolved shearogram output.

6. The method of claim 1, further comprising:
generating symmetric phase resolved butterfly patterns.

7. The method of claim 1, further comprising:
determining whether there is a subsurface structure based, at least in part, on the surface changes of the target surface.

8. A shearography system comprising:
a device to stimulate a target surface;
a sensor to sense the target surface; and
at least one non-transitory storage medium comprising:
an image generator to generate a first specklegram image, a second specklegram image, a third specklegram image, and a fourth specklegram image based on data from the sensor;
phase logic that unequally phase steps the first, second, third and fourth specklegram images with a shearing interferometer to respective phases θ1, θ2, θ3, and θ4; wherein cos θ1=cos θ4 and cos θ2=cos θ3; wherein sin θ2 is not equal to sin θ3;
shearogram logic that produces a shearogram to ascertain surface changes of the target surface; wherein the shearogram is based on a phase resolved shearogram equation expressed as a ratio of differences of specklegrams:

$$Shearogram = N\frac{S_4 - S_1}{S_2 - S_3}$$

wherein the first specklegram is represented by ($S_1$), the second specklegram is represented by ($S_2$), the third specklegram is represented by ($S_3$) and the fourth specklegram is represented by ($S_4$); and wherein N is a normalization term; and regularization logic that regularizes the shearogram with multiple arctan regularization functions to produce a regularized phase resolved shearogram output with low background noise levels in the shearogram.

9. The shearography system of claim 8, wherein θ1 is 0, θ2 is π/2, θ3 is 3π/2, and θ4 is 2π.

10. The shearography system of claim 8, wherein the regularization logic writes the phase resolved shearogram in terms of a numerator and a denominator according to the following equation:

$$PR = \frac{T_{41}}{T_{23}}; T_{41} = (S_4 - S_1); T_{23} = (S_2 - S_3)$$

where $S_1$, $S_2$, $S_3$, and $S_4$ are unfiltered specklegrams.

11. The shearography system of claim 10, wherein the regularization logic computes the arctan regularization according to the following equation:

$$PR \Rightarrow \frac{1}{2}[\text{atan2}(\{T_{23}\}, \{T_{41}\}) - \text{atan2}(\{T_{23}\}, \{-T_{41}\})].$$

12. The shearography system of claim 8, wherein the at least one non-transitory storage medium further comprises interference fringe analysis logic that applies interference fringe analysis techniques to the regularized phase resolved shearogram output.

13. The shearography system of claim 8, further comprising:
a second shearogram.

14. The shearography system of claim 8, wherein the at least one non-transitory storage medium further comprises detection logic that detects surface changes of the target surface; wherein the surface changes are indicative of a subsurface structure.

15. The method of claim 4, further comprising:
recovering the shearogram by applying arctan operations to the arctan regularization.

16. The method of claim 4, wherein the arctan regularization is configured and arranged to maintain a strict mapping to the phase value of the shearogram.

17. The method of claim 5, wherein the interference fringe analysis techniques comprise phase filtering.

18. The method of claim 5, wherein the interference fringe analysis techniques comprise interferometry.

19. The shearography system of claim 12, wherein the interference fringe analysis techniques comprise phase filtering tools.

20. The shearography system of claim 12, wherein the interference fringe analysis techniques comprise interferometry algorithms.

* * * * *